Aug. 24, 1937.   D. D. GORDON   2,091,238
METHOD OF MANUFACTURING GLASS BOTTLES
Filed Dec. 16, 1935
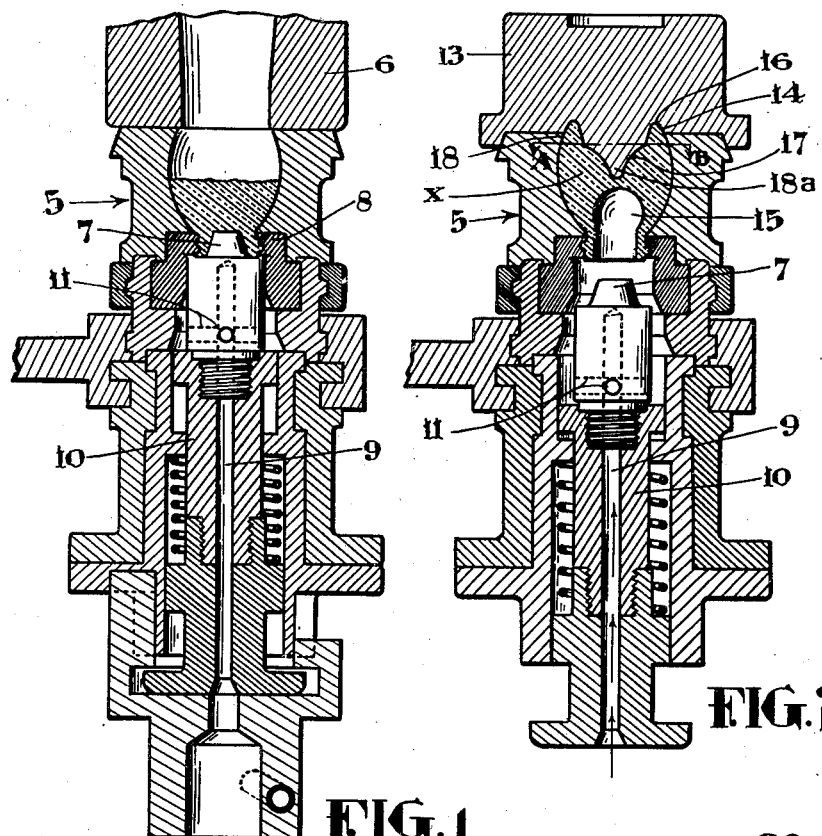
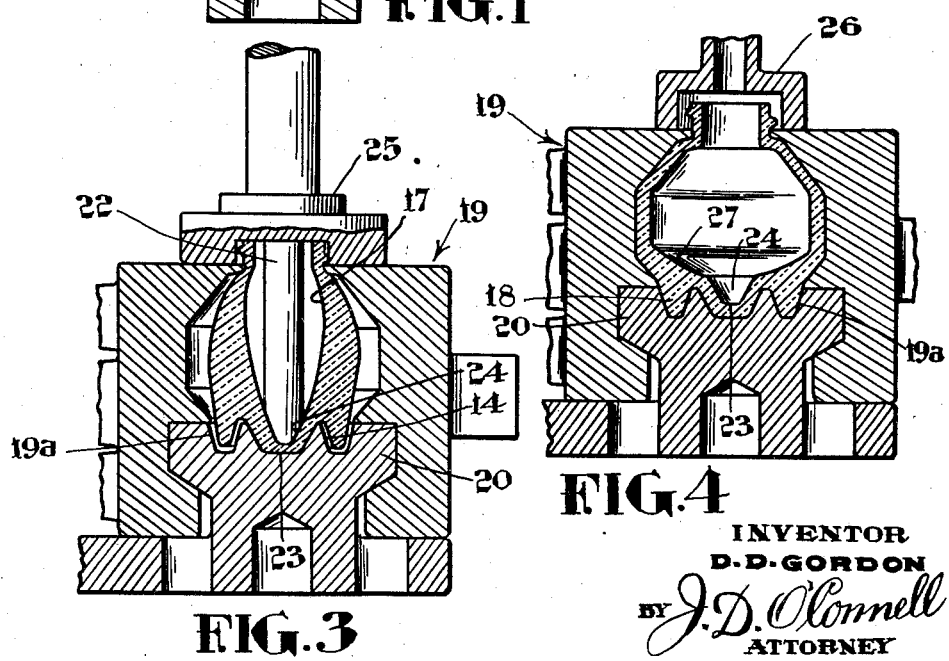
INVENTOR
D. D. GORDON
BY J. D. O'Connell
ATTORNEY Patented Aug. 24, 1937

2,091,238

UNITED STATES PATENT OFFICE 2,091,238

METHOD OF MANUFACTURING GLASS BOTTLES

Donald D. Gordon, Montreal, Quebec, Canada, assignor to Dominion Glass Company Limited, Montreal, Quebec, Canada, a corporation of Canada Application December 16, 1935, Serial No. 54,628

2 Claims. (Cl. 49—80)

This invention relates to the manufacture of blown glassware, and is particularly concerned with the manufacture of small glass bottles in which ink is commonly sold to the retail trade.

The primary object of this invention is to provide an economical and commercially feasible method of manufacture for producing an ink bottle having a central bottom well in which a fountain pen, draftsman's quill or the like may be dipped to obtain a full charge as long as there is sufficient ink in the bottle to substantially fill the well. A particular feature of the invention is that, during the formation of the bottom well, the adjacent bottom wall surface is sloped downwardly toward the mouth of the well.

Proceeding now to a more detailed description reference will be had to the accompanying drawing in which:

Figure 1 is a vertical sectional view through a mold and illustrates the initial step of my improved method of manufacturing a glass bottle.

Figures 2, 3, and 4 are views similar to Figure 1 but illustrating subsequent steps of my improved method of manufacture.

Referring more particularly to Figure 1, 5 represents an inverted parison mold partially filled by a charge of molten glass deposited therein through a changing funnel 6, or in any other suitable manner. In this mold the glass charge is subjected to pressure and suction in order to force the glass downwardly into the cavity between the neck pin 7 and the neck finishing ring 8. The required suction is applied around the tip of the neck pin in a well known manner by connecting the passage 9 of the neck pin plunger 10 with any suitable source of suction, the space surrounding the neck pin being in communication with the upper end of passage 9 through the neck pin passages 11. The pressure may be applied by means of a suitable blow head fitted to the funnel 6 or directly to the filling opening of the mold.

After the neck finishing operation a closure 13 is fitted to the bottom of the inverted mold 5 and the neck pin and neck pin plunger are withdrawn to the position shown in Figure 2. At this stage of the process the bore 9 of the plunger is connected with a source of pressure to blow the glass upwardly around the depending projection 14 of the closure 13. This produces the bubble 15 and causes part of the glass to enter and fill an annular groove 16 surrounding the base of the projection 14.

The step illustrated in Figure 2 produces a partially extended glass parison having the bubble 15 extending inwardly from the neck portion and a cavity 17 extending inwardly from the bottom portion, said cavity being formed by the projection 14 and having the mouth portion thereof bounded by an annular wall portion 18 which constitutes an annular foot portion of the finished bottle, as will be clear from inspection of Figure 4.

The shape of the cavity produced in the parison by the projection 14 is such that the glass is concentrated in a thick mass, $x$, surrounding the cavity directly below the plane $a$—$b$ representing the base of the annular foot portion 18. To this end the projection 14 is made circular and of slightly decreasing circumference from its base to a plane coinciding with the plane $a$—$b$. From this plane downward the projection 14 decreases rapidly in circumference to provide a tip portion 18a having substantially the shape of an inverted cone with slightly concave sides.

Upon completion of the step illustrated in Figure 2, the partially expanded parison is transferred to a finishing mold 19 in which it is suspended with its neck portion uppermost and its annular foot portion 18 received in the annular groove 19a of the bottom finishing plate 20. A plunger 22 is then forced downwardly into the partially expanded parison so that a portion of the glass is pressed outwardly through the parison cavity 14 and into a cavity 23 provided in the plate 20 centrally of the groove 19a. By this operation the parison is provided with an internal cavity 24 which, in the finished bottle, constitutes a centrally disposed bottom well as illustrated in Figure 4.

Upon completion of the step illustrated in Figure 3 the plunger 22 and plunger head 25 are replaced by a blow head 26 by means of which blowing pressure is applied to blow the parison to the final shape shown in Figure 4. During this final blowing operation the glass is displaced so that the bottom wall surface formed around the well 24 is sloped downwardly toward the mouth of the well, as indicated at 27 in Figure 4. In order to obtain this sloping bottom surface 27 during the final blowing operation, it is necessary to have a thick mass of glass in the wall portion of the parison adjacent the mouth of the cavity 24 which is formed by the plunger pressing operation, illustrated in Figure 3. According to the present invention this is provided for by shaping the projection 14 so that, during the step illustrated in Figure 2, a thick mass of glass is formed around the cavity 17 directly below the plane A—B.

The advantage of providing the sloping bottom wall 27 around the well 24 is that all of the ink on the bottom surface of the bottle tends to drain into the well 24 and will substantially fill the latter to provide a charge for a fountain pen, even when there is only a small quantity of ink left in the bottle.

The process herein described may be carried out by slight modifications of well known glass working machines such as the machine known to the trade as the O'Neill glass working machine No. 48. This machine is equipped with a mold suitable for carrying out the steps illustrated in Figures 1 and 2 and may be adapted to the carrying out of the remaining steps of my process by substituting the finishing molds shown in Figures 3 and 4 for the finishing molds usually employed in this type of machine. The operation of the neck pin plunger from the position shown in Figure 1 to the position shown in Figure 2, as well as the transfer of the partially expanded parison to the finishing mold in Figure 3, is accomplished by mechanism which is a standard part of the O'Neill and other well known glass working machines.

Having thus described what I now consider to be the preferred embodiment of my invention it will be understood that various modifications in the method of carrying out the different steps of my improved process may be resorted to within the scope and spirit of the appended claims.

What I claim is:

1. The method of manufacturing a glass bottle which consists in producing a partially expanded hollow glass parison having an outwardly facing cavity in the bottom wall thereof, applying plunger pressure to force a portion of the glass outwardly into said cavity to thereby produce an inwardly facing well communicating with the hollow interior of the parison, and then expanding the parison to its final shape.

2. The method of manufacturing a glass bottle which consists in producing a partially expanded hollow glass parison having an outwardly facing cavity in the bottom wall thereof, applying plunger pressure to the inner surface of said bottom wall in line with the cavity whereby a portion of the glass is displaced into said cavity to form a well communicating with the hollow interior of the parison, and then blowing the parison to its finished shape.

DONALD D. GORDON.